Patented Jan. 31, 1928.

1,657,997

UNITED STATES PATENT OFFICE.

CHARLES DEAN HYTEN, OF BENTON, ARKANSAS.

POTTERY.

No Drawing.   Application filed July 24, 1924.   Serial No. 727,999.

The present invention relates broadly to the art of ceramics, and particularly to a novel clay product and the process of manufacturing the same. The invention, more specifically speaking, has to do with the production of clay pottery of a decorative character by virtue of the use of clay of different colors.

It is quite common in the art of pottery making to produce clay products in colors, that is, each article is made from a homogeneous mass of a particular color of clay, either from naturally or artificially colored clay, but the art which has been founded by me involves the use of multi-colored clay in each manufacture, the varying colors in the composite formation of the particular article being caused to blend or the layers of the different colors to be displaced relatively to each other in such a manner as to produce a beautiful, distinctive, and highly artistic decoration.

It is a well known fact in the art to which this invention relates that clays of different colors shrink in drying or in firing in different degrees, depending more or less upon the silicate content or the character of the color base, so that before my contribution to the art it was impracticable to use different colors of clay in a single or composite article of manufacture with any degree of success without encountering difficulties of distortion, fracture or breakage.

My invention therefore resides primarily in the preparation of the clays preliminary to the forming and firing of the product so as to enable the use of various colors for decorative purposes and to obtain a uniform shrinkage of the clays under firing, this being incident to the use of either natural or artificially colored clays.

In carrying out my invention the natural or white clay is mined in the usual way and is then introduced into a blunger mill along with water where it is thoroughly mixed into a solution or suspension of the consistency of cream, substantially speaking. While in the mill and in this state of consistency, the coloring mixture is added. prior to which step, however, the proper proportioned ingredients controlling the degree of shrinkage of the clay are incorporated. This coloring mixture varies according to the particular color which is involved, but the proportions only and not the ingredients are all that require modification to produce a composite clay mass in which the shrinkage characteristics of each of the clays is designed to be uniform throughout. Naturally the chemical constituents of the particular clay's base used are taken into consideration. A desirable composition is composed of 90 per cent clay and an admixture of approximately 10 per cent coloring matter, whiting and ground flint.

As an exemplification of the preparation of the coloring mixture, the following formulæ may be used for the respective colors in the approximate proportions specified, it being understood that the white colored clay does not require a coloring pigment but does ordinarily require a shrinkage controlling factor or ingredient.

|       | Whiting. | Ground Flint. | Color pigment. |
|-------|---------|--------------|----------------|
|       | Grams.  | Grams.       |                |
| Blue  | 350     | 350          | 300 grams cobalt oxide. |
| Red   | 350     | 350          | 475 grams ferric oxide. |
| Gray  | 350     | 350          | 350 chromic oxide. |
| White | 4       | 4            | 92 white clay |

Specifically, to the dry ingredients of any one of these formulæ a sufficient amount of water is added to make a solution of cream consistency, and this is then introduced into a ball grinder for pulverizing. When thoroughly ground and mixed the solution is then added to the clay solution in the blunger mill where further thorough mixing of the ingredients is accomplished. It is notable that in the blue coloring mixture, the clay in plastic condition is black, but this, when fired, will turn into a shade of blue, the particular shade of which depends upon the degree of heat as its controlling factor. In like manner, the gray color mixture changes from a green plastic to gray when fired, so that it will be understood that I am able to produce clays of a wide range of shades from the formulæ which are herein given, by simply controlling the degree of heat.

Other coloring bases than those specified may be used when desired and they are given merely as examples of the manner in which I obtain the artificially colored clays, if the natural colored clays are not employed.

Proceeding with the process followed, after the introduction of the coloring mixture into the blunger mill as above specified, and its thorough admixture, it is run through a screen while in solution of approximately 140 mesh, after which it is put into plaster bottomed vats to extract the surplus water; the pasty mass is then allowed to dry for a period running from a week to ten days depending upon atmospheric conditions.

At this time the colored clay is in plastic condition about the consistency of putty but somewhat more plastic. Each separate colored clay prepared in accordance with the foregoing process is then kneaded well and a lump of each clay desired is taken. These lumps are placed one upon another and the whole cut into the proper sized mass for forming the particular object to be manufactured. This cut composite mass is then placed upon a potter's wheel and manipulated in the usual well known manner to form the particular shaped vessel or article. In this form a very great range of variations in decorative effect may be produced by the potter so that the different colors which are displaced with relation to each other form beautiful surface designs.

When shaped as desired they are removed from the wheel and allowed to partly dry, whereupon they are put on a turning lathe and polished until they have a smooth, fine finish.

After thorough drying, a glaze solution such as used in the ordinary pottery manufacture is pumped inside the dry article which adhering to the piece somewhat as a coating like whitewash produces under fire a glaze which makes the vessel waterproof.

After the glaze is applied the pottery is put in a kiln and fired approximately forty-eight hours at a temperature of approximately two thousand degrees Fahrenheit.

It will be apparent from the foregoing that an article made in the foregoing manner may possess any combination of colors desired and will vary in the shade of colors according to the degree of heating which is applied to the formed article.

Having thus described my invention, what I claim as new and desire to secure by Letters Patent is:

1. The process of preparing a clay for the manufacture of ceramic objects which consists in reducing the clay to a consistency of cream, separately admixing and grinding a color base material, and a shrinkage controlling material, combining the color mixture with the clay and mixing the same, extracting the excess moisture until in plastic condition and finally rotating said plastic material and shaping an object therefrom during such rotation.

2. The process of forming composite ceramic products which consists in reducing separate batches of clay to a substantially liquid consistency, adding to each batch a color base, and a shrinkage controlling material, each batch being proportioned relative to the color base used to produce a uniform shrinkage in subsequent firing of an article formed of the combined batches, extracting the surplus moisture from the batches, rotating said combined batches and forming an object therefrom during such rotation, and subjecting the formed article to a substantially high degree of heat.

3. The process of producing a ceramic object which consists in superposing a plurality of batches of different colored clays in plastic condition, and rotating the superposed batches during the shaping formation of the object to blend said batches.

4. The process of producing a ceramic object which consists in superposing a plurality of batches of different colored clays in plastic condition, and rotating the superposed batches during the shaping formation of the object to blend said batches, each of said batches having an ingredient to effect uniform shrinkage of the several batches when fired.

5. A cylindrical shaped ceramic product composed of a plurality of different colored clays, each different clay containing a shrinkage controlling substance so proportioned relative to the color base as to impart to such clay approximately the same shrinkage characteristic as the other clays, said clays being displaced circumferentially as an incident to manipulation during rotation of the composite clays while in plastic condition so as to produce a blended and variegated striae of irregular form.

In testimony whereof I affix my signature.

CHARLES DEAN HYTEN.